(12) United States Patent
Reichenbach et al.

(10) Patent No.: US 7,213,759 B2
(45) Date of Patent: May 8, 2007

(54) METHOD AND AN APPARATUS TO READ A BARCODE

(75) Inventors: Juergen Reichenbach, Emmendingen (DE); Carl Joseph Hafner, Reute (DE); Uwe Schopflin, Niederwinden (DE)

(73) Assignee: Sick AG, Waldkirch/Breisgau (DE)

( * ) Notice: Subject to any disclaimer, the term of this patent is extended or adjusted under 35 U.S.C. 154(b) by 165 days.

(21) Appl. No.: 11/075,107

(22) Filed: Mar. 8, 2005

(65) Prior Publication Data

US 2005/0224581 A1  Oct. 13, 2005

(30) Foreign Application Priority Data

Apr. 8, 2004  (DE) ............. 10 2004 017 504

(51) Int. Cl.
*G06K 7/10* (2006.01)
(52) U.S. Cl. .................. 235/462.01; 235/375
(58) Field of Classification Search ..............
235/462.01–462.25, 472.01, 472.02, 472.03, 235/454, 455, 494, 375
See application file for complete search history.

(56) References Cited

U.S. PATENT DOCUMENTS

| | | | | |
|---|---|---|---|---|
| 5,365,048 A | * | 11/1994 | Komiya et al. | 235/462.08 |
| 5,420,411 A | * | 5/1995 | Salatto et al. | 235/462.22 |
| 5,457,308 A | * | 10/1995 | Spitz et al. | 235/462.12 |
| 5,821,519 A | * | 10/1998 | Lee et al. | 235/462.27 |
| 6,073,847 A | | 6/2000 | Reichenbach et al. | |
| 6,565,004 B2 | * | 5/2003 | Ishii et al. | 235/462.25 |
| 6,729,603 B1 | * | 5/2004 | McQueen et al. | 235/375 |
| 2001/0006192 A1 | * | 7/2001 | Watanabe et al. | 235/462.25 |
| 2002/0021835 A1 | | 2/2002 | Andreasson et al. | |
| 2002/0121551 A1 | | 9/2002 | De Renzis | |

FOREIGN PATENT DOCUMENTS

| | | |
|---|---|---|
| DE | 19711873 C2 | 3/2003 |
| DE | 698 10 898 T2 | 11/2003 |
| EP | 0310921 | 12/1989 |
| EP | 0 359 010 B1 | 1/1998 |

* cited by examiner

*Primary Examiner*—Thien M. Le
(74) *Attorney, Agent, or Firm*—Harness, Dickey & Pierce, P.L.C.

(57) ABSTRACT

The invention relates to a method of reading a machine-readable barcode including a pre-determined number of code elements, in particular bars and spaces, with a respective picture being taken by means of optical imaging of at least two adjacent and/or mutually overlapping part sections of the bar code, with the individual part sections each including a code element and the part sections including in sum all the code elements of the barcode, with the pictures being stored in a data store, and with the stored pictures or parts thereof being put together for the reconstruction of the information encoded by the barcode. The invention further relates to a corresponding apparatus.

32 Claims, 3 Drawing Sheets a)

b)

c)

d)

a)

b)

c)

METHOD AND AN APPARATUS TO READ A BARCODE

CROSS-REFERENCE TO RELATED APPLICATIONS

This application claims the benefit of Germany Application No. 10 2004 017 504.7, filed Apr. 8, 2004. The disclosure of the above application is incorporated herein by reference.

FIELD OF THE INVENTION

The invention relates to a method of reading a machine-readable barcode including a pre-determined number of code elements, in particular bars and spaces. The invention further relates to a corresponding apparatus.

BACKGROUND OF THE INVENTION

Methods and apparatuses for the machine reading of a barcode printed, for example, on a package are generally known. Generally, a barcode can be read using a contact pen or a laser scanner. It is furthermore also known to read a barcode by means of a matrix camera which, unlike scanners, has no moving parts, but photo-sensitive CCD elements, with a picture of the barcode being able to be generated by optical imaging.

It is, however, a disadvantage with such a matrix camera that it has a limited image field. This has the consequence that only those barcodes can be read by a matrix camera which completely fit into the image field of the matrix camera. In contrast, barcodes which project beyond the image field of the matrix camera due to their size cannot be read completely and can thus not be decoded. A conventional size of the image field of a matrix camera amounts, for example, to 30 mm×40 mm.

SUMMARY OF THE INVENTION

It is the underlying object of the present invention to develop a method and an apparatus of the initially named kind such that a barcode exceeding the size of the image field of a matrix camera can also be decoded by means of the matrix camera.

This object is satisfied in accordance with the invention, starting from a method of the initially named kind, in that a respective picture is taken by means of optical imaging of at least two part sections of the barcode which are adjacent and/or overlap one another, with the individual part sections each including at least one code element and the part sections including in sum all the code elements of the barcode; in that the pictures are stored in a data store; and in that the stored pictures or parts thereof are put together for the reconstruction of the information encoded by the barcode.

The part of the object relating to the apparatus is satisfied, starting from an apparatus of the initially named kind, by a picture-taking apparatus for the taking of pictures by means of optical imaging of at least two part sections of the barcode which are adjacent and/or overlap one another, with the individual part sections each including at least one code element and the part sections including in sum all the code elements of the barcode, by a data store for the storage of the pictures and a reconstruction unit for the putting together of the stored pictures or parts thereof for the reconstruction of the information encoded by the barcode.

The invention is characterized in that the part sections of the barcode to be read, in particular of a 1D or 2D barcode, are detected by means of optical imaging, in particular photographically and two-dimensionally, are stored as pictures and the pictures are subsequently put together to form an image of the barcode such that the information encoded by the barcode can be restored from the image of the barcode. An image of the barcode is also to be understood as every picture of the barcode which permits a complete reconstruction of the information encoded by the barcode. The image thus has to extend only over the whole running length of the barcode, but not over its whole height.

The part sections of the barcode each include at least one code element. In order for a code element to be enclosed by a part section of the barcode, the code element does not have to be completely arranged inside the part section. It is rather sufficient for a section of the code element encompassing the width of the code element to be arranged inside the part section of the barcode. This in particular means that the code elements do not have to be taken over their whole height for the reconstruction of the encoded information. All part regions together include all code elements of the barcode.

A major advantage of the invention consists of the fact that barcodes can also be read by means of a matrix camera or the like which were previously not able to be read completely, and thus were also not able to be decoded, due to the limited image field of the matrix camera. In particular the module width of the barcode to be read, i.e. the width of the narrowest code element, can be increased. Barcodes with a larger module width are less prone to insufficiencies on the printing of the barcode and can therefore be read with greater reliability.

In accordance with an advantageous embodiment of the invention, the pictures are taken by means of a picture-taking apparatus, preferably a camera, in particular a linear camera or a matrix camera. With a camera, the reading distance can be set particularly easily by adjusting the focal length of the lens. A camera is furthermore characterized by a high sensitivity with low-contrast barcodes. With a linear camera or a matrix camera, the barcode to be read is imaged optically on a linear or matrix-shaped arrangement of CCD sensors. The barcode can in particular also be illuminated by one or more LEDs of the camera.

It is furthermore proposed in accordance with the invention that the pictures are taken sequentially, in particular with a constant image frequency. It can hereby in particular be avoided that a plurality of picture-taking apparatuses are required for the taking of the pictures. When only one picture-taking apparatus is used, the apparatus for the reading of the barcode can be manufactured particularly cost-favorably. Generally, however, a plurality of picture-taking apparatuses can be used.

It is particularly advantageous for the barcode to be moved relative to the picture-taking apparatus, in particular at a constant speed, for the taking of the pictures. This is in particular of advantage when the bar code moves through the image field of the picture-taking apparatus in this process. Adjacent and/or mutually overlapping part sections of the barcode can hereby be taken in a particularly simple manner. The barcode can, for example, be moved relative to the picture-taking apparatus by means of a conveyor belt.

In accordance with a particularly preferred embodiment of the invention, on the putting together of the pictures or of the parts thereof, their mutual relative positions are calculated from the image frequency of the shots and the speed of the barcode. With a constant image frequency f and a constant speed v, the shift $\Delta s$ of the sequentially taken pictures can in particular be calculated from the ratio of the speed v and the image frequency f: $\Delta s \propto v/f$.

Additionally or alternatively, on the putting together of the pictures or of the parts thereof, their mutual relative positions can be determined by correlation of coinciding picture contents of the pictures or of the parts thereof. The image of the barcode can be generated in this process by superimposing the coinciding picture contents of the pictures or of the parts thereof. A determination of the mutual relative positions of the pictures or of the parts thereof by correlation of coinciding picture contents is preferably carried out when the speed of the barcode and/or the image frequency of the shots is only known approximately.

Additionally or alternatively, on the putting together of the pictures or of the parts thereof, their mutual relative positions can be determined by a comparison of the picture positions at least of start, stop and/or center marks of the barcode. The putting together of the pictures or of the parts thereof or the correlation of coinciding picture contents is, however, not limited to the use of specific start, stop and/or center marks of the barcode. On the putting together or on the correlation, the actual code elements can also be made use of by which the relevant information is actually encoded. These code elements can be used alternatively or additionally to the specific start, stop and/or center marks of the barcode on the putting together or on the correlation. The pictures or the parts thereof can be put together to form the image of the barcode by superimposition of the picture positions of e.g. the start, stop and/or center marks. The picture positions, e.g. the start, stop and/or center marks, are preferably used for the determination of the mutual relative positions of the pictures or of the parts thereof when the speed of the barcode and/or the image frequency of the shots is at least largely unknown.

In accordance with a further preferred embodiment of the invention, the stored pictures or the parts thereof are put together in a reconstruction buffer. The reconstruction buffer can be made as a separate component or as part of the data store in which the pictures of the part sections of the barcode are stored.

Respective picture contents of the pictures extending along at least one line are preferably put together for the reconstruction of the information encoded by the barcode. A line formed by image points of a picture in a row next to one another can in particular be orientated perpendicular to the longitudinal extent of the code elements imaged in the picture. Generally, however, the line used for the reconstruction can have any desired angle with respect to the code elements. If the barcodes are applied to conveyed objects and are read during the conveying of the objects, the line can extend parallel to the conveying direction, and indeed independently of the orientation of the barcode relative to the conveying direction, i.e. it is deliberately accepted in this version that the barcode extends obliquely to the conveying direction. Such a slanted positioning of the code elements relative to the line used for the reconstruction is, however, completely unproblematic for the invention. It is hereby made possible that only parts of the stored pictures have to be put together to be able to fully decode the information encoded in the barcode so that in particular the reconstruction buffer requires less storage space. Furthermore, conventional algorithms, which are based, for example, on a scanning process of the barcode along a line can be used for the reconstruction of the barcode.

The pictures or the parts thereof can be stored and/or put together in a color representation, a gray value representation or a binary representation. The pictures or the parts thereof available in a color representation or in a gray value representation can in particular be converted into a binary representation. The required storage space and the computing time requirements for the putting together of the pictures can hereby be reduced. Pictures in a color representation or a gray value representation can be present, for example, on the reading of 2D barcodes, in particular stack codes or matrix codes.

Picture contents of the pictures extending along a line and present in a binary representation can be encoded along the running length for non-lossy data compression. On the putting together of the pictures or of the parts thereof, data sequences of the pictures encoded along the running length can in particular be superimposed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
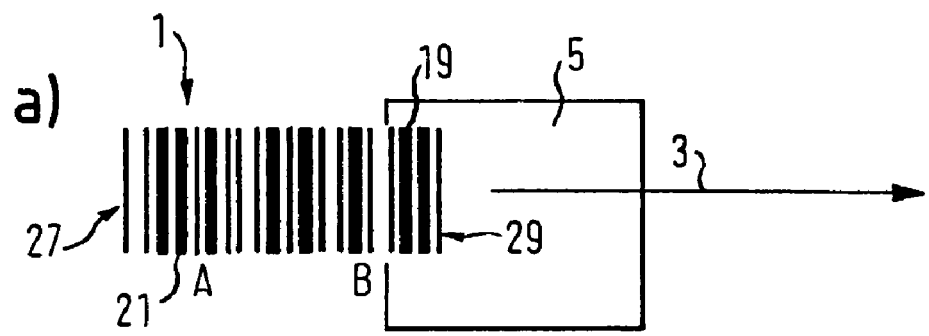
FIGS. 1a–1d show a barcode which is moved through the image field of a matrix camera.
Figure 1:
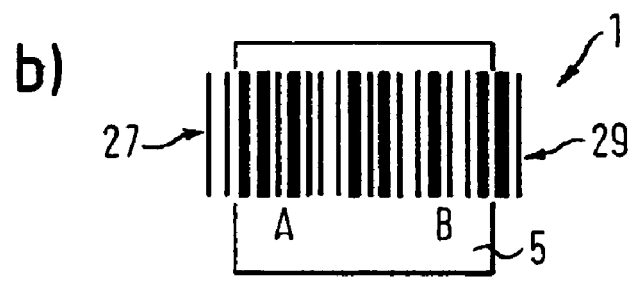
Figure 1:
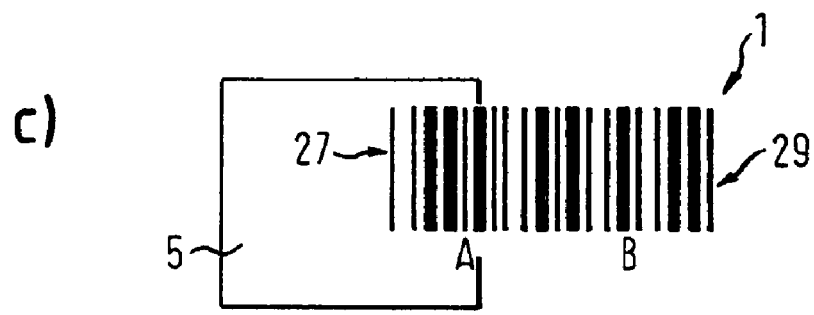
Figure 1:
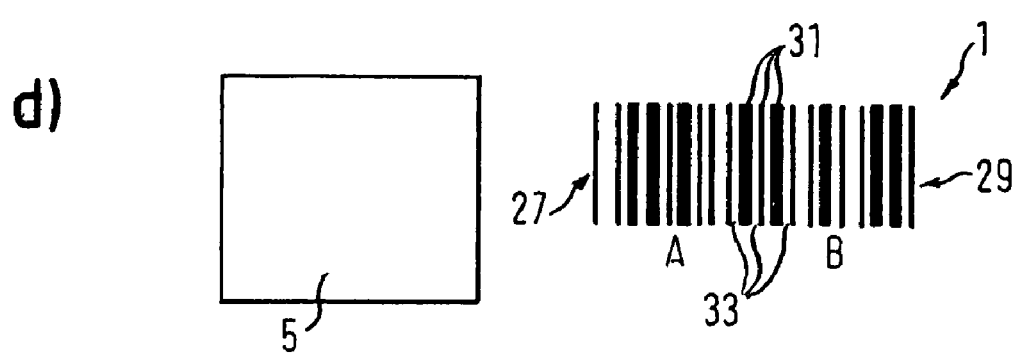

FIG. 1 shows a 1 D barcode 1 to be read which includes a pre-determined number of code elements 31, 33 of different widths. Both the linear bars 31 and the spaces 33 present between the bars are called code elements 31, 33 in this process. The barcode 1, which can be printed on a package, is moved, for example by means of a conveyor belt (not shown), along a movement direction 3 through the image field 5 of a matrix camera (not shown). FIGS. 1a to 1d show the barcode 1 at different points in time of its movement which takes place at a constant speed v. The speed v can, however, also generally be variable. In contrast to FIG. 1, the barcode 1 can also be moved obliquely through the image field 5 of the matrix camera as long as the widths of all code elements 31, 33 of the barcode 1 can be detected.

As can in particular be recognized with reference to FIG. 1b, the barcode 1 does not completely fit into the image field 5 of the matrix camera due to its size, but rather its two ends 27, 29 project laterally beyond the image field 5 of the matrix camera. In FIGS. 1a and 1c, the barcode 1 is arranged with a respective one of its two ends 27, 29 inside the image field 5. In FIG. 1d, the barcode 1 has already left the image field 5 again.

FIGS. 2a to 2c show three pictures 7, 9, 11 of part sections of the barcode 1 which were taken by means of the matrix camera at the points in time shown in FIGS. 1a to 1c. In FIG. 2a, the fore-running end of the barcode 1, when considered in the movement direction 3, and an image 13 of a front part section of the barcode 1 are detected. In FIG. 2b, an image 15 of a central part section of the barcode 1 is detected. FIG. 2c shows the trailing end of the barcode 1, when considered in the movement direction 3, with an image 17 of a rear part section of the barcode 1 being detected. Generally, however, only two or any number of images can also be taken. The pictures 7, 9, 11 taken by means of the matrix camera are stored in a data store.

Figure 2:
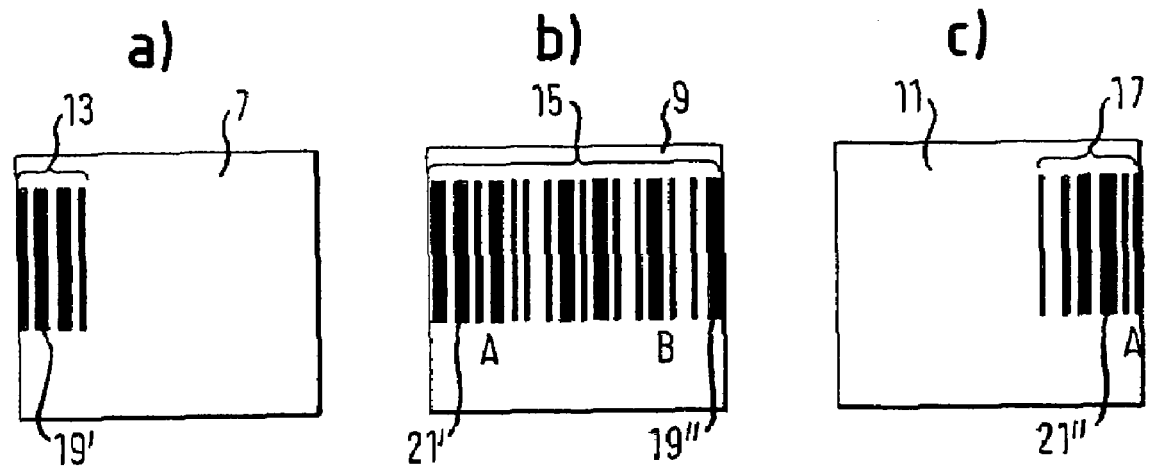
FIGS. 2a–2c show a single frame sequence of the barcode of FIG. 1, with the pictures having been taken at different points in time.

In this process, for example, a bar 19 of the barcode 1 (FIG. 1) is associated both with the front part section and with the middle part section of the barcode 1. Accordingly, images 19', 19" of the bar 19 are contained in the pictures 7, 9 (FIG. 2). A bar 21 of the barcode 1 (FIG. 1), in contrast, is associated with both the rear part section and the middle part section of the barcode 1, so that images 21', 21" are contained in the pictures 9, 11 (FIG. 2).

Figure 3:
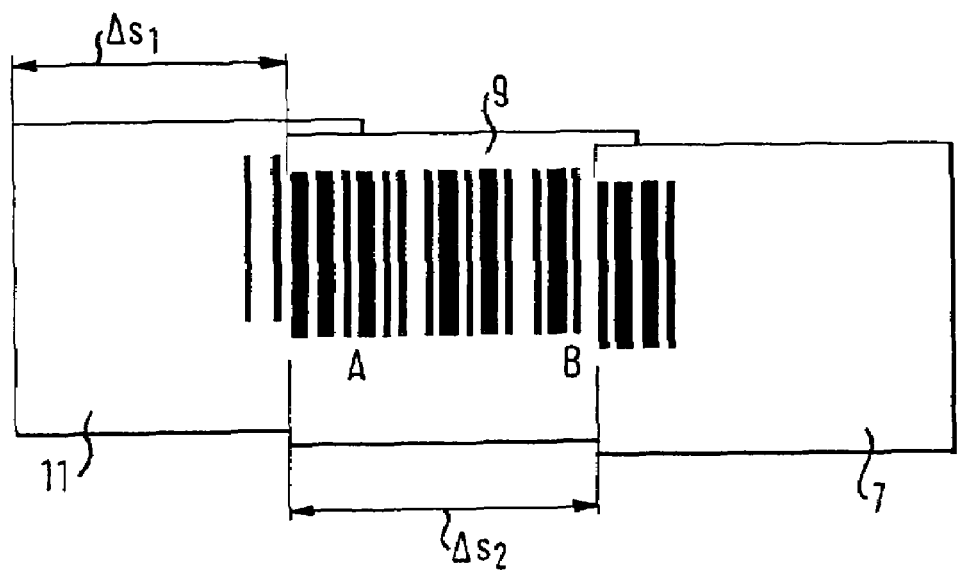
FIG. 3 shows a put-together single-frame sequence of the pictures of FIG. 2.

As is shown in FIG. 3, for the reconstruction of the information encoded by the barcode 1, the pictures 7, 9, 11 are put together in a reconstruction buffer (not shown) by means of a reconstruction unit (not shown), for example a microprocessor, to form a complete image of the barcode 1, with the picture 9 or 11 being displaced with respect to the picture 7 or 9 respectively by $\Delta s_1$ or $\Delta s_2$ in the x direction which corresponds to the movement direction 3 of the barcode 1. In FIG. 3, the pictures 7, 9, 11 are only offset with respect to one another in the y direction for reasons of illustration.

The mutual displacement $\Delta s_1$ or $\Delta s_2$ of the sequentially taken pictures 7, 9, or 9, 11 can be calculated with a constant and known speed v from the product of the speed v of the barcode 1 and of the time span t between the two shots: $\Delta s_1 \propto v_i \times t_i$. Alternatively or additionally, the displacement $\Delta s_i$ can also be determined by correlation of the images of those code elements 31, 33 which are imaged in both pictures 7, 9 or 9, 11. As a rule, a plurality of code elements 31, 33 arranged in a row and in particular including the code element 19 or 21 respectively are required for such a correlation. However, coinciding picture contents can also be correlated which represent the surroundings of the barcode 1.

The correlation of coinciding picture contents of the pictures 7, 9, 11 can in particular be used for the fine correction of a mutual shift $\Delta s_i$ calculated, for example, from the product of a speed v of the barcode 1 only known approximately and a time span t between the two shots. Moreover, the shift $\Delta s_i$ can also be determined by a comparison of the picture positions of start, stop and/or center marks of the barcode 1. Generally, the superimposing operation on the putting together of the pictures 7, 9, 11 can consist of the averaging of corresponding pixels of the pictures 7, 9, 11.

In accordance with a further embodiment of the invention, as will be explained in the following, unlike in FIG. 3, only parts of the pictures 7, 9, 11 are put together to form an image of the barcode 1.

Figure 4:
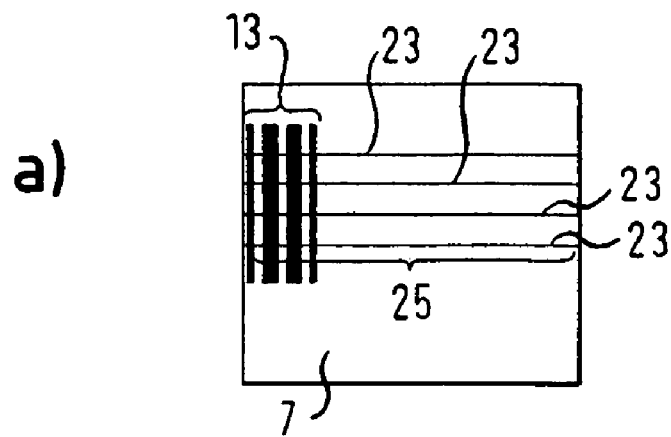
FIGS. 4a–4c show the single-frame sequence of FIG. 2, with the picture contents of the pictures extending along the lines shown being read.
Figure 4:
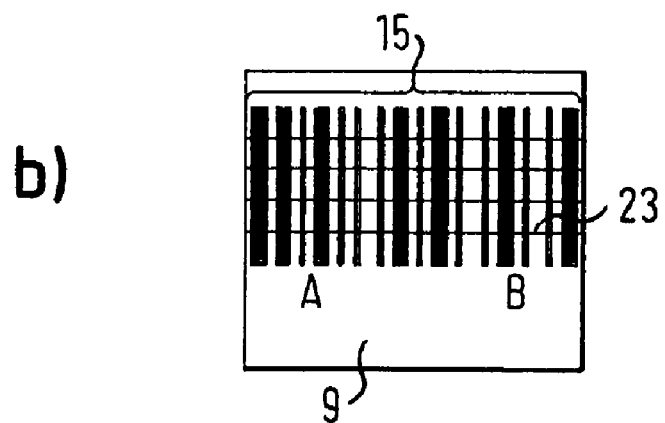
Figure 4:
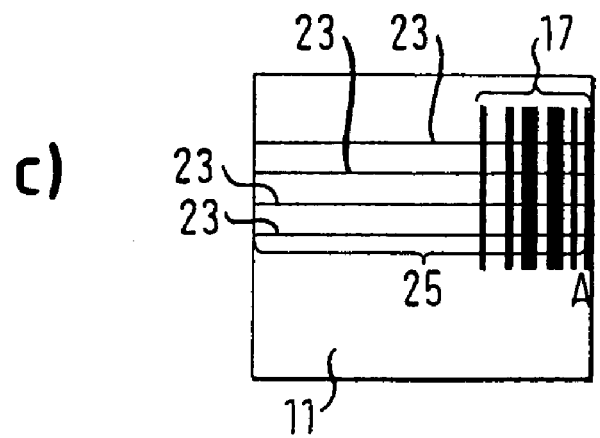

In FIGS. 4a to 4c, the pictures 7, 9, 11 of FIGS. 2a to 2c are shown. Picture contents, for example pixel sequences 25 of the pictures 7, 9, 11, extending along one or more lines 23 are first read for the reconstruction of the information encoded by the barcode 1. The lines 23 each extend perpendicular to the longitudinal extent of the code elements 31, 33 imaged in the respective picture 7, 9, 11. Unlike in FIG. 4, the lines 23 can, however, also extend at different heights through the pictures 7, 9, 11 and/or obliquely to the longitudinal extent of the imaged code elements 31, 33.

If the pixel sequences 25 read along the lines 23 are present in a color or gray value representation, they can be converted into a binary representation. Pixel sequences 25 present in a binary representation can be encoded by running length so that in particular the individual widths of the code elements 31, 33 of the barcode 1 are present as sequential numerical values.

For the reconstruction of the information encoded by the barcode 1, pixel sequences 25 read along one or more lines 23 are put together in the reconstruction buffer already explained above to form an image of the barcode 1, with the encoded information being able to be reconstructed from the image of the barcode 1. An averaged image of the barcode 1 can be generated with the aid of a plurality of lines 23.

The mutual shift of the pixel sequences 25 of the taken pictures 7, 9, 11 read along the lines 23 can be calculated or determined in analogy to the calculation or determination of the mutual shift of the taken pictures 7, 9 or 9, 11.

In the method in accordance with the invention, individual pictures 7, 9, 11 of the barcode 1 or parts 25 thereof, in particular pixel sequences 25 arranged along a line 23, taken by means of a matrix camera, are displaced with respect to one another and superimposed on one another in correct phase so that the barcode 1 can be fully decoded.

| Reference numeral list | |
|---|---|
| 1 | barcode |
| 3 | movement direction |
| 5 | image field |
| 7, 9, 11 | picture |
| 13, 15, 17 | part section |
| 19 | bar |
| 19', 19" | image of a bar |
| 21 | bar |
| 21', 21" | image of a bar |
| 23 | line |
| 25 | pixel sequence |
| 27, 29 | end of the barcode |
| 31, 33 | code element |

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of reading a machine-readable barcode (1) including a pre-determined number of code elements, in particular bars and spaces, characterized in that a respective picture (7, 9, 11) is taken by means of optical imaging of at least two adjacent and/or mutually overlapping part sections (13, 15, 17) of the barcode (1), with the individual part sections (13, 15, 17) each including at least one code element and the part sections (13, 15, 17) including in sum all code elements of the barcode (1);

in that the barcode is moved at a constant speed relative to the means of optical imaging for taking of the pictures;

in that the pictures (7, 9, 11) are taken sequentially at a constant image frequency and stored in a data store; and in that the stored pictures (7, 9, 11) or parts (25) thereof are put together for the reconstruction of the information encoded by the barcode (1), such that their mutual relative positions are calculated from the image frequency of the shots and the speed of the barcode.

2. A method in accordance with claim 1, characterized in that the pictures (7, 9, 11) are taken by means of a picture-taking apparatus, preferable a camera, in particular a linear camera or a matrix camera.

3. A method with claim 2, characterized in that the barcode (1) is moved at a constant speed relative to the picture-taking apparatus for the taking of pictures (7, 9, 11).

4. A method in accordance with claim 1, characterized in that, on the putting together of the pictures (7, 9, 11) or of the parts (25) thereof, their mutual relative positions are determined by correlation of coinciding picture contents of the pictures (7, 9, 11) or of the parts (25) thereof.

5. A method in accordance with claim 1, characterized in that, on the putting together of the pictures (7, 9, 11) or of the parts (25) threreof, their mutual relative positions are determined by a comparison of the picture positions at least or start, stop and/or center marks of the barcode (1).

6. A method in accordance with claim 1, characterized in that the stored pictures (7, 9, 11) or the parts (25) thereof are put together in a reconstruction buffer.

7. A method in accordance with claim 1, characterized in that respective picture contents of the pictures (7, 9, 11) extending along at least one line (23) are put together for the reconstruction of the information encoded by the barcode (1).

8. A method in accordance with claim 1, characterized in that the pictures (7, 9, 11) or the parts (25) thereof are stored and/or put together in a color representation, a gray value representation or a binary representation.

9. A method in accordance with claim 8, characterized in that the pictures (7, 9, 11) or the parts (25) thereof available in a color representation or in a gray value representation are converted into a binary representation.

10. A method in accordance with claim 1, characterized in that image contents of the picture (7, 9, 11) extending along a line (23) and present in a binary representation are encoded by running length.

11. An apparatus for the reading of a machine-readable barcode (1) including a pre-determined number of code elements, in particular bars and spaces, characterized by
a picture-taking apparatus for the taking of pictures (7, 9, 11) by means of optical imaging of at least two adjacent and/or mutually overlapping part sections (13, 15, 17) of the barcode (1), with the individual part sections (13, 15, 17) each including at least one code element and the part sections (13, 15, 17) including in sum all code elements of the barcode (1);
a data store for storage of the pictures (7, 9, 11); and
a reconstruction unit for the putting together of the stored pictures (7, 9, 11) or of parts (25) thereof for the reconstruction of the information encoded by the barcode (1) such that their mutual relative positions are calculated from a frequency at which the pictures (7, 9, 11) were taken and a speed at which the barcode is moved in relation to the picture-taking apparatus.

12. An apparatus in accordance with claim 11, characterized in that the picture-taking apparatus is a linear camera or a matrix camera.

13. A method of reading a machine-readable barcode (1) including a pre-determined number of code elements, in particular bars and spaces, characterized in that
a respective picture (7, 9, 11) is taken by means of optical imaging of at least two adjacent and/or mutually overlapping part sections (13, 15, 17) of the barcode (1), with the individual part sections (13, 15, 17) each including at least one code element and the part sections (13, 15, 17) including in sum all code elements of the barcode (1);
in that the pictures (7, 9, 11) are stored in a data store; and
in that the stored pictures (7, 9, 11) or parts (25) thereof are put together for the reconstruction of the information encoded by the barcode (1), such that their mutual relative positions are determined by correlation of coinciding picture contents of the pictures (7, 9, 11) or of the parts (25) thereof.

14. A method in accordance with claim 13, characterized in that the pictures (7, 9, 11) are taken by means of a picture-taking apparatus, preferable a camera, in particular a linear camera or a matrix camera.

15. A method in accordance with claim 13, characterized in that the pictures (7, 9, 11) are taken sequentially, at a constant image frequency.

16. A method in accordance with claim 14, characterized in that the barcode (1) is moved at a constant speed relative to the picture-taking apparatus for the taking of the pictures.

17. A method in accordance with claim 13, characterized in that the stored pictures (7, 9, 11) or the parts (25) thereof are put together in a reconstruction buffer.

18. A method in accordance with claim 13, characterized in that respective picture contents of the pictures (7, 9, 11) extending along at least one line (23) are put together for the reconstruction of the information encoded by the barcode (1).

19. A method in accordance with claim 13, characterized in that the pictures (7, 9, 11) or the parts (25) thereof are stored and/or put together in a color representation, a gray value representation or a binary representation.

20. A method in accordance with claim 19, characterized in that the pictures (7, 9, 11) or the parts (25) thereof available in a color representation or in a gray value representation are converted into a binary representation.

21. A method in accordance with claim 13, characterized in that image contents of the picture (7, 9, 11) extending along a line (23) and present in a binary representation are encoded by running length.

22. An apparatus for the reading of a machine-readable barcode (1) including a pre-determined number of code elements, in particular bars and spaces, characterized by
a picture-taking apparatus for the taking of pictures (7, 9, 11) by means of optical imaging of at least two adjacent and/or mutually overlapping part sections (13, 15, 17) of the barcode (1), with the individual part sections (13, 15, 17) each including at least one code element and the part sections (13, 15, 17) including in sum all code elements of the barcode (1);
a data store for storage of the pictures (7, 9, 11); and
a reconstruction unit for the putting together of the stored pictures (7, 9, 11) or of parts (25) thereof for the reconstruction of the information encoded by the barcode (1) such that their mutual relative positions are determined by correlation of coinciding picture contents of the pictures (7, 9, 11) or of the parts (25) thereof.

23. A method of reading a machine-readable barcode (1) including a pre-determined number of code elements, in particular bars and spaces, characterized in that
a respective picture (7, 9, 11) is taken by means of optical imaging of at least two adjacent and/or mutually overlapping part sections (13, 15, 17) of the barcode (1), with the individual part sections (13, 15, 17) each including at least one code element and the part sections (13, 15, 17) including in sum all code elements of the barcode (1);

in that the pictures (7, 9, 11) are stored in a data store; and in that the stored pictures (7, 9, 11) or parts (25) thereof are put together for the reconstruction of the information encoded by the barcode (1), such that their mutual relative positions are determined by a comparison of the picture positions at least of start, stop and/or center marks of the barcode.

24. A method in accordance with claim 23, characterized in that the pictures (7, 9, 11) are taken by means of a picture-taking apparatus, preferable a camera, in particular a linear camera or a matrix camera.

25. A method in accordance with claim 23, characterized in that the pictures (7, 9, 11) are taken sequentially, at a constant image frequency.

26. A method in accordance with claim 24, characterized in that the barcode (1) is moved at a constant speed relative to the picture-taking apparatus for the taking of the pictures.

27. A method in accordance with claim 23, characterized in that the stored pictures (7, 9, 11) or the parts (25) thereof are put together in a reconstruction buffer.

28. A method in accordance with claim 23, characterized in that respective picture contents of the pictures (7, 9, 11) extending along at least one line (23) are put together for the reconstruction of the information encoded by the barcode (1).

29. A method in accordance with claim 23, characterized in that the pictures (7, 9, 11) or the parts (25) thereof are stored and/or put together in a color representation, a gray value representation or a binary representation.

30. A method in accordance with claim 29, characterized in that the pictures (7, 9, 11) or the parts (25) thereof available in a color representation or in a gray value representation are converted into a binary representation.

31. A method in accordance with claim 23, characterized in that image contents of the picture (7, 9, 11) extending along a line (23) and present in a binary representation are encoded by running length.

32. An apparatus for the reading of a machine-readable barcode (1) including a pre-determined number of code elements, in particular bars and spaces, characterized by a picture-taking apparatus for the taking of pictures (7, 9, 11) by means of optical imaging of at least two adjacent and/or mutually overlapping part sections (13, 15, 17) of the barcode (1), with the individual part sections (13, 15, 17) each including at least one code element and the part sections (13, 15, 17) including in sum all code elements of the barcode (1);

a data store for storage of the pictures (7, 9, 11); and a reconstruction unit for the putting together of the stored pictures (7, 9, 11) or of parts (25) thereof for the reconstruction of the information encoded by the barcode (1) such that their mutual relative positions are determined by comparison of the picture positions at least of start, stop and/or center marks of the barcode.

* * * * *